United States Patent [19]

Amsler et al.

[11] Patent Number: 4,570,348
[45] Date of Patent: Feb. 18, 1986

[54] MEASURING APPARATUS

[76] Inventors: Jerry D. Amsler, 202 Keystone; Robert E. Furrow, 209 E. Birch, both of Enid, Okla. 73701

[21] Appl. No.: 653,432

[22] Filed: Sep. 24, 1984

[51] Int. Cl.⁴ ................................................ G01B 5/04
[52] U.S. Cl. .................................. 33/129; 33/141 R; 33/134 R
[58] Field of Search ................. 33/129, 132 R, 132 A, 33/133, 134 R, 134 A, 136, 141.5, 141 R, 141 E

[56] References Cited

U.S. PATENT DOCUMENTS

| | | | |
|---|---|---|---|
| 1,417,021 | 5/1922 | Bevel | 33/134 R |
| 1,491,446 | 4/1924 | Uber | 33/134 R |
| 1,492,320 | 4/1924 | Copeland | 33/134 R |
| 1,639,973 | 8/1927 | Orstrand | 33/134 R |
| 1,969,969 | 8/1934 | Dunagin | 33/134 R |
| 1,982,184 | 11/1934 | Williams et al. | 33/134 R |
| 2,139,810 | 12/1938 | Duncan . | |
| 2,327,506 | 8/1943 | Conrad et al. . | |
| 2,383,844 | 8/1945 | Bouslog | 33/134 R |
| 2,573,640 | 10/1951 | Connors . | |
| 2,591,615 | 4/1952 | Saff et al. | 33/129 |
| 2,761,986 | 9/1956 | Wald et al. . | |
| 2,778,117 | 1/1957 | Heinemann . | |
| 2,782,515 | 2/1957 | Mayes . | |
| 2,783,540 | 3/1957 | Berry . | |
| 2,815,577 | 12/1957 | Ferre . | |
| 2,876,549 | 3/1959 | Adamson et al. . | |
| 2,987,822 | 6/1961 | Arps | 33/134 R |
| 3,284,906 | 11/1966 | Holleman | 33/134 R |
| 3,465,447 | 9/1969 | Bowers et al. . | |
| 3,520,062 | 7/1970 | Tanguy . | |
| 3,566,478 | 3/1971 | Hurlston . | |
| 3,753,294 | 8/1973 | Attali et al. . | |
| 3,812,589 | 5/1974 | Schultheis . | |
| 3,874,108 | 4/1975 | Connor . | |
| 3,978,588 | 9/1976 | Richardson et al. . | |
| 4,024,645 | 5/1977 | Giles . | |
| 4,068,384 | 1/1978 | Holy et al. . | |
| 4,226,023 | 10/1980 | Gravert . | |
| 4,481,714 | 11/1984 | Nelson | 33/129 X |

FOREIGN PATENT DOCUMENTS 1144664 3/1969 United Kingdom ............. 33/134 R

Primary Examiner—Harry N. Haroian
Attorney, Agent, or Firm—Alan T. McCollom

[57] ABSTRACT

Apparatus for measuring length of an elongate cable. A frame having a hole therethrough includes a pair of rollers mounted for rotation thereon. The circumferences of the rollers are rollingly engaged with one another over the hole and a cable which is to be measured is held between the rollers and passed downwardly through the hole thereby rotating the rollers. A magnet is mounted on one of the rollers adjacent the circumference thereof. Mounted on the frame adjacent the circumference of the roller having the magnet mounted thereon is a magnetically-activated switch which closes each time the magnet passes thereby. The switch provides an input to a transmitter which generates a signal including pulses indicative of the number of rotations of the wheel having the magnet mounted thereon. The signal is received by a receiver and the pulses are counted and displayed in order to provide a visual indication of the number of pulses, such being directly proportional to the length of cable which passes between the rollers.

13 Claims, 8 Drawing Figures

MEASURING APPARATUS

BACKGROUND AND SUMMARY OF THE INVENTION

The instant invention pertains to measuring apparatus and more particularly to such apparatus which is used to measure the length of elongate material which is passed by the apparatus.

In the past, when it is necessary to measure a length of elongate material, e.g., cable being lowered into a well bore, various hand-held apparatus have been used which engage the cable by means of sheaves which are rotated as cable passes therethrough. Such rotation is used to generate a count on a mechanical counter in order to provide an indication of the length of cable unwound. Such devices have proved unsatisfactory in several respects. It is dangerous to hold such a device while cable is being wound off a large reel. Further, such devices have not proved to be entirely accurate.

Other apparatus for measuring cable length which incorporate a magnet on a rotating pulley have been proposed but have not proved satisfactory in all operations in which cable is lowered into a well bore. For example, after a well has been drilled and completed, and subsequent to a certain amount of production, it may be necessary to swab the bore in order to remove water from the well. Such swabbing is accomplished by lowering a line having jars suspended therefrom into the well bore. Such jars may be as long as twenty to thirty feet. Prior to lowering such jars into a well bore, a vertical pipe equal to the length of the jars, i.e., as long as twenty to thirty feet, is mounted on the well head in a vertical position on top of a valve which controls production from the well. The jars are received in the pipe which is sealed at the top prior to opening the well valve in order to permit lowering the jars into the well. It is difficult to accurately measure the length of cable being lowered into the well bore since such a measurement must be taken at the point at which the cable is unwound from its reel or at the point at which the cable enters the upright pipe which may be a distance of twenty to thirty feet above the ground.

Past measuring apparatus have proved to be unsuitable for use in measuring cable which is lowered into a well as described above.

One of the advantages of the instant invention is to permit accurate and safe measurement of a length of cable being lowered into a well bore in association with equipment as described above as well as in other configurations.

The instant invention includes a frame having a roller mounted for rotation on the top thereof. A second roller rotatably mounted on the frame has its circumference rollingly engaged with that of the other roller. A magnet is mounted on one of the rollers adjacent the circumference thereof and means for detecting a magnetic field is mounted on the frame adjacent the circumference of the roller having the magnet mounted thereon. When elongate material is passed between the rollers, they are rotated thus causing the detecting means to generate a pulse for each complete rotation of the roller having the magnet mounted thereon. The length of the material is proportional to the pulses so generated.

These and other advantages of the instant invention will become more fully apparent when the following detailed description is read in view of the accompanying drawings wherein.

DETAILED DESCRIPTION OF THE PREFERRED EMBODIMENT OF THE INVENTION

Figure 1:
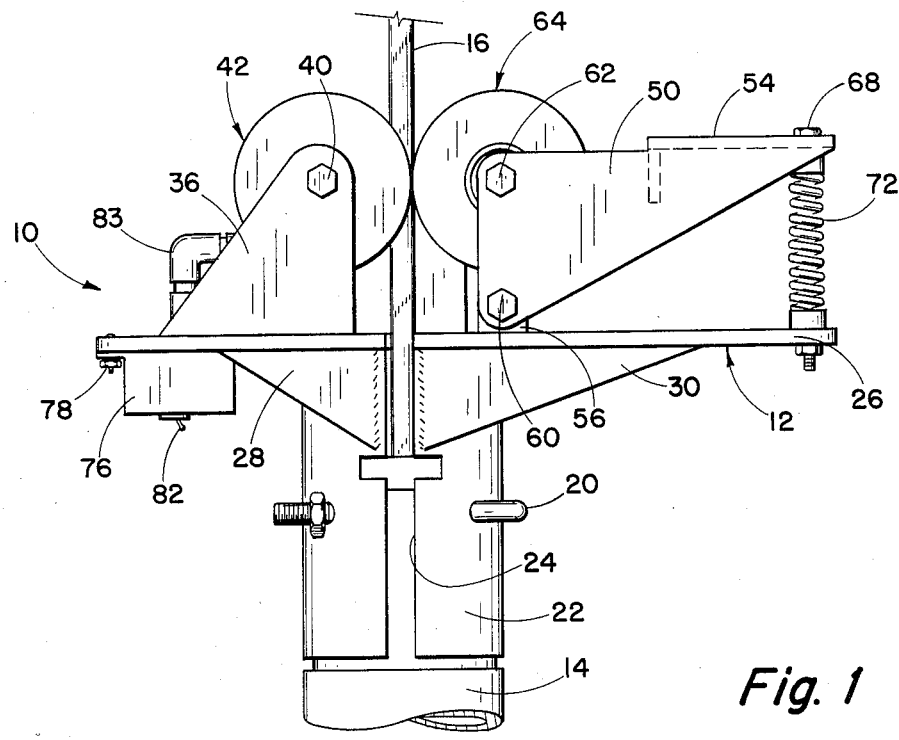
FIG. 1 is a side view of a portion of the preferred embodiment of the invention.

Indicated generally at 10 in FIG. 1 is a portion of the preferred embodiment of the invention. Included therein is a frame 12 which is mounted on the top of a pipe 14. A cable 16, a portion of which is shown, extends downwardly through frame 12 into pipe 14. Pipe 14 is mounted on a well head and the instant embodiment of the invention is used to measure the length of cable 16 which passes through frame 12 into the well bore via pipe 14. Prior to describing the structure of the preferred embodiment, description will be made of the conventional apparatus with which the instant embodiment of the invention is used. Referring for a moment to FIG. 5, pipe 14 includes therein a gasket 18 through which cable 16 passes. The gasket includes a pair of holes therethrough through which a u-bolt 20 passes to secure the gasket to the pipe (as well as to frame 12). The gasket is of the type which may be pressurized by hydraulic fluid. In certain well operations, it may be necessary to lower a string of what are known as jars into the well in order to swab the well. When such is necessary a pipe, like pipe 14, which is typically twenty to thirty feet tall, is mounted on the well head in a vertical position. The pipe includes jars which are suspended from cable and which typically are almost as long as the pipe. Gasket 18 is pressurized in a conventional manner to prevent liquids and gas from flowing out the top of pipe 14. Next, a valve in the well head is opened to permit lowering the jars into the well bore. As will be hereinafter made apparent, the portion of the apparatus of the instant invention shown in FIGS. 1-5 may be mounted on the top of pipe 14 in order to provide an indication of the length of cable 16 lowered into the well bore.

Figure 2:
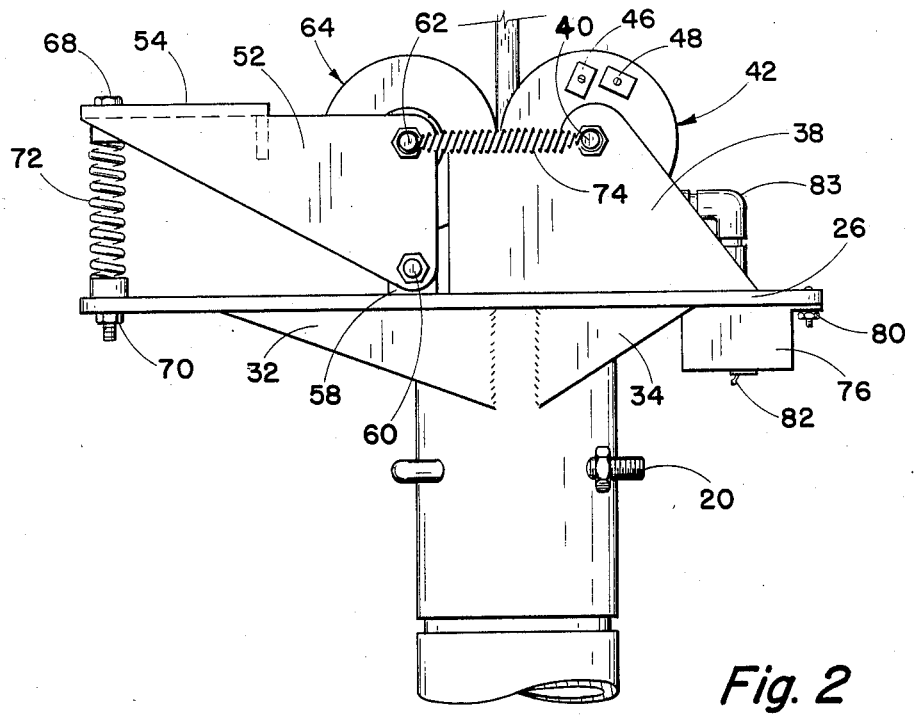
FIG. 2 is a view similar to FIG. 1 showing the other side of the preferred embodiment.
Figure 3:
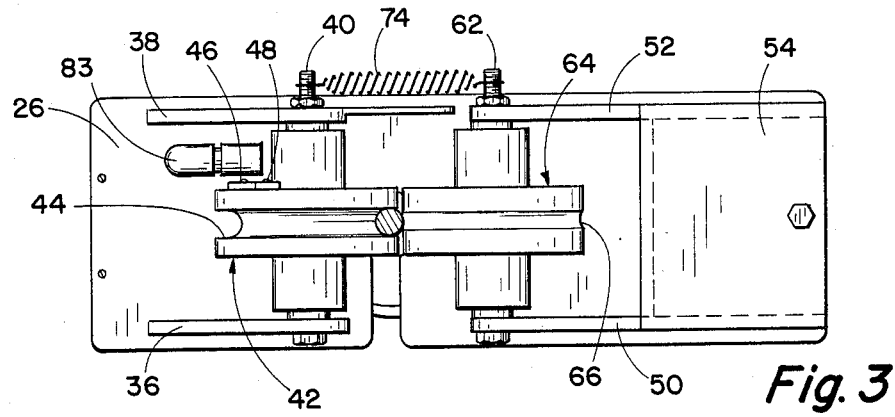
FIG. 3 is a top plan view of a portion of the preferred embodiment shown in FIG. 1.

Looking now at FIGS. 1 and 2, frame 12 includes a cylindrical base 22 having what is referred to herein as a first slot 24 formed longitudinally along one side thereof. A platform 26 is mounted at substantially right angles to the axis of base 22 on the top thereof. Support brackets 28, 30, 32, 34 are each welded along one edge to the underside of platform 26 and along another edge to base 22. Brackets 28, 30 are in substantially the same plane with one another. Likewise, brackets 32, 34 are substantially coplanar as well as being substantially parallel to brackets 28, 30. A pair of upright ears 36, 38 are mounted along one edge to the top of platform 26.

Each ear includes a hole therethrough through which a bolt or axle 40 is received. A roller 42, referred to herein as a first roller, includes a concave recess or groove 44 about its circumference and is mounted for rotation on axle 40. In the embodiment of the invention shown in the drawings, the circumference of roller 42 is exactly one foot. A pair of magnets 46, 48 are fixedly mounted on one side of roller 42. A pair of substantially triangular brackets 50, 52 are maintained in substantially parallel-spaced relationship via plate 54 which is welded to brackets at substantially right angles thereto. Brackets 50, 52 are pivotally attached to a pair of ears 56, 58 which are fixedly mounted on platform 26 and extend upwardly therefrom. A bolt 60 is received through holes in brackets 50, ear 56, ear 58 and bracket 52 and provides an axis about which brackets 50, 52 pivot relative to platform 26.

An axle or bolt 62 is received through holes in brackets 50, 52 and has mounted for rotation thereon a roller 64. Roller 64, like roller 42, includes a groove 66 although, as can be seen, groove 66 is less deep than groove 44. Roller 64 is referred to herein as a second roller.

A bolt 68 is received through holes in plate 54 and in platform 26 as is perhaps best viewed in FIGS. 1 and 2. The bolt includes a nut 70 at the lower end thereof which secures the bolt in position as shown. Bolt 68 receives a spring 72 substantially along the length of the bolt and serves to keep the spring constrained between plate 54 and platform 26. Another spring 74 is secured on one end to axle 40 and on the other to axle 62, in FIG. 2. Each of the springs serves to bias roller 64, through action on brackets 50, 52 against roller 42.

A transmitter housing 76 is mounted on the underside of platform 26 at one end thereof via bolts 78, 80. A switch 82 is mounted on the underside of housing 76 and controls power to circuitry contained within housing 76 which will be described in greater detail hereinafter. A switch housing 83 is mounted on platform 26 above transmitter housing 76. The switch housing is made of plastic and includes therein a magnetically-activated switch (not visible) which is connected via conductors which pass from the switch housing through a hole (not visible in FIGS. 1–3) in platform 26 to circuitry contained in transmitter housing 76.

Figure 4:
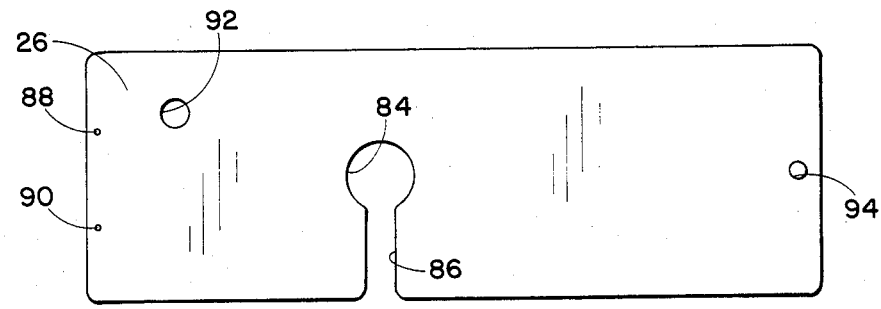
FIG. 4 is a top plan view similar to FIG. 3 but with some of the structure shown in FIG. 3 removed therefrom.
Figure 5:
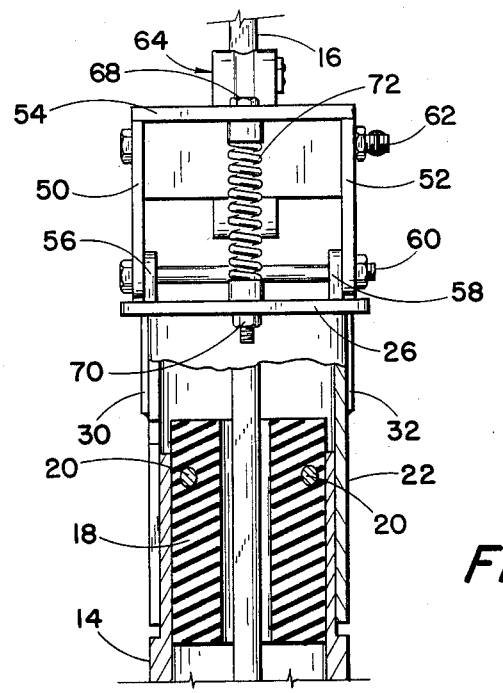
FIG. 5 is a view of one end of a portion of the preferred embodiment shown partially in cross section.

In FIG. 4, platform 26 is shown less all of the previously-described structure associated with the platform. The platform includes a bore 84, through which cable 16 passes in FIGS. 1–3, and a slot 86, referred to herein as a second slot which connects bore 84 with the outer edge of platform 26. A pair of holes 88, 90 are provided to receive bolts 78, 80 for bolting transmitter housing 76 to the underside of the platform.

A hole 92 is provided for receiving switch housing 83 therein in order to permit the previously-mentioned conductors to connect the switch in housing 83 with circuitry in transmitter housing 76. Finally, a hole 94 is provided to permit connection of bolt 68 with platform 26 as previously described.

Figure 6:
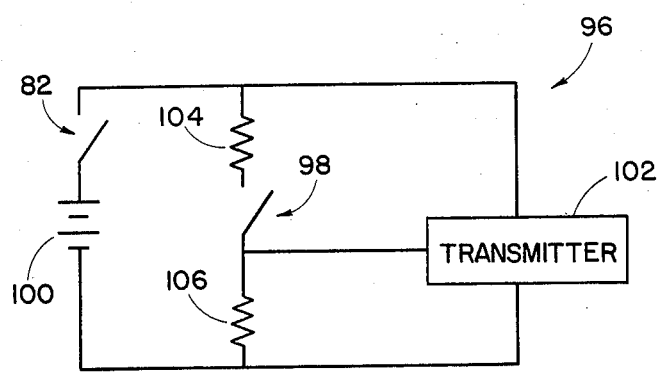
FIG. 6 is a schematic diagram of a portion of the preferred embodiment of the invention.
Figure 7:
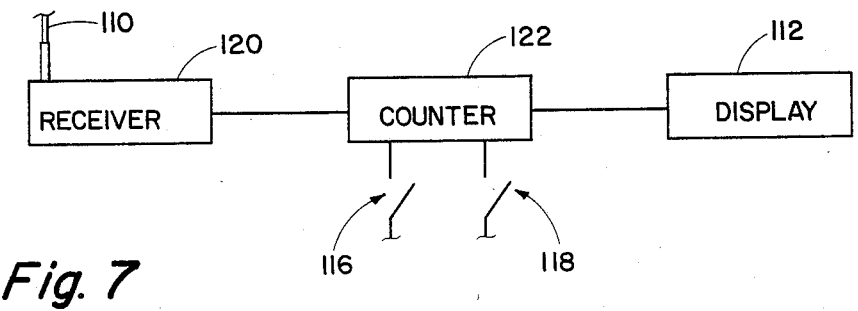
FIG. 7 is a schematic diagram of another portion of the preferred embodiment of the invention.
Figure 8:
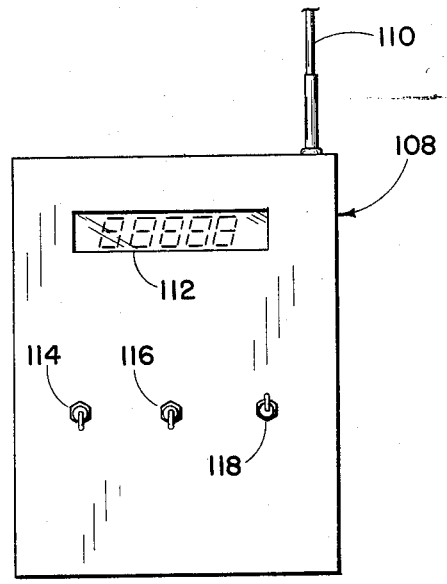
FIG. 8 is a portion of the preferred embodiment containing the circuitry diagramed in FIG. 7.

Turning now to FIGS. 6–8 indicated generally at 96 in FIG. 6 is circuitry which for the most part is contained within transmitter housing 76. A magnetically-activated switch 98, also known as a reed relay, is received within switch housing 83 and is connected by conductors, as shown in the schematic of FIG. 6, with the remainder of circuitry 96 (which is contained within the transmitter housing). A voltage source or battery 100 supplies power to conductors via switch 82, which as will be recalled is the power switch on the transmitter housing, to a conventional transmitter 102. A pair of biasing resistors 104, 106 provide an input voltage to transmitter 102 when switch 98 closes and causes the transmitter to transmit a signal having different characteristics than when the switch is open. Thus, sequential opening and closing of the switch causes transmitter 102 to transmit a pulsed signal.

In FIG. 8 indicated generally at 108 is a receiving circuitry housing. An antenna 110 is mounted on housing 108 for receiving signals transmitted by transmitter 102. Included in the housing is a display 112 for displaying a number which is equal to the number of feet of cable 16 which have been lowered into the well. Mounted on housing 108 are switches 114, 116, 118 for controlling circuitry contained therein.

FIG. 7 shows in schematic form the circuitry which is in housing 108. Structure identified in FIG. 8 that is shown schematically in FIG. 7 is identified with the number used in FIG. 8. Included within the circuitry in housing 108 is a receiver 120 which is operatively connected to antenna 110. The receiver is tuned to receive signals from transmitter 102 and to generate an output which is applied to a counter 122 via a conductor as shown. The output so generated by receiver 120 is dependent upon and related to information contained in the signal transmitted by transmitter 102.

Consideration will now be given to the operation of the preferred embodiment of the invention. Typically, jars which are used to swab a well are received within a pipe, like pipe 14, and have a cable, like cable 16, extending through a gasket, like gasket 18, at the top of the pipe. The cable is reeved with conventional blocks on a workover rig and wound onto a reel. When it is desired to swab a well, pipe 14 is mounted on a well head, gasket 18 is pressurized, and a valve on the well head is opened to permit lowering of the jars on the cable into the well bore.

When it is desired to use the instant embodiment of the invention to count the number of feet of cable lowered into the well bore, prior to mounting pipe 14 on the well head, u-bolt 20 is removed from the pipe. Thereafter, frame 12 is arranged coaxially with pipe 14 by moving the frame to permit cable 16 to be received through slots 24, 86 thus aligning the cable coaxially with bore 84 in the platform. In order to so align the cable, brackets 50, 52 are pressed downwardly by pressing plate 54 so as to compress spring 72. Such action moves roller 64 away from roller 42 thus permitting the cable to be received between the rollers. Releasing brackets 50, 52 permits biasing action of spring 72 to bias the rollers together so that the cable is received therebetween as shown in the drawings. Thereafter u-bolt 20 is reinserted through holes in cylindrical base 22 to maintain position of gasket 18 relative to pipe 14.

Thereafter transmitter 102 is supplied power by switching switch 82 to an on position and pipe 14 is mounted on the well head in an upright position. As cable 16 is lowered into the well, wheels 42, 64 rotate thus causing magnets 46, 48 to pass switch housing 83 once for each revolution of roller 42. Each time the magnets pass the switch housing, magnetically-activated switch 98 closes thus causing transmitter 102 to transmit a signal including a pulse which is received by receiver 120 in housing 108. Each pulse so received is counted by conventional digital counter 122. Counter 122 includes a conventional reset switch 116 and a conventional switch 118 which, in one position causes the counter to count upwardly, and in the other position causes the counter to count downwardly. Thus, when cable is being lowered into the well, switch 118 is placed in the upward count position so that the counter registers an increasing number corresponding to the number of feet of cable being lowered into the well. The output of the counter is applied to an input of display 112 in a conventional fashion to drive display 112 to indicate the number of pulses counted. As will be recalled, the circumference of wheel 42 is exactly one foot. Thus, for each rotation of the roller, a foot of cable is lowered into the well and a single pulse is generated which is ultimately displayed as a part of the count shown on display 112. When the jars are at their lower most position in the well bore, switch 118 is switched to its other position so that as cable is reeled in, the counter is counting downwardly thus indicating on the display the decreasing number of feet of cable in the well bore.

It is to be appreciated that additions and modifications to the instant embodiment of the invention may be made without departing from the spirit thereof which is defined in the following claims.

We claim:

1. A measuring apparatus comprising:
    a substantially planar frame;
    a first axle support mounted on the upper side of said frame;
    a first axle mounted on said first axle support;
    a first roller rotatably mounted on said first axle;
    a second axle support mounted on the upper side of said frame;
    a second axle mounted on said second axle support;
    a second roller rotatably mounted on said second axle, said first and second axles being substantially parallel and the edges of said rollers being opposite one another;
    a tubular base extending downwardly from the lower side of said frame with the axis of said base being at a substantially right angle to said frame;
    an opening in said frame to permit communication between the interior of said base and the upper side of said frame;
    a first slot formed in said frame and extending from one edge thereof to said opening;
    a second slot formed axially in said tubular base along the length thereof, said first and second slots being in alignment with one another;
    a magnet mounted on one of said rollers adjacent the circumference thereof; and
    means for detecting a magnetic field mounted on said frame adjacent the circumference of the roller having said magnet mounted thereon.

2. The apparatus of claim 1 wherein said apparatus further includes means for biasing said roller edges together and wherein said second axle support is pivotally mounted on the upper side of said frame to enable pivotal movement of said second roller toward and away from said first roller.

3. The apparatus of claim 1 wherein said detecting means includes a magnetically-activated switch.

4. The apparatus of claim 3 wherein said switch is operatively connected to a transmitter for generating a transmitted signal including pulses related to the number of times said switch is activated.

5. The apparatus of claim 4 wherein said apparatus further includes:
    a receiver for receiving the signal transmitted by said transmitter;
    a counter for counting the number of pulses included in such a transmitted signal; and
    a display operatively connected to said counter for generating a visual indication of the number of pulses so counted.

6. Apparatus for providing a measurement of the amount of cable lowered into a well bore having a cylindrical tube extending from the top thereof, said apparatus comprising:
    a substantially planar platform;
    a tubular base extending downwardly from the lower side of said platform with the axis of said base being at a substantially right angle to said platform, said base having a diameter which permits sliding coaxial engagement with said cylindrical tube;
    a bore formed in said platform to permit communication between the interior of said base and the top of said platform;
    a first slot formed in said platform and extending from one edge thereof to said bore;
    a second slot formed axially in said tubular base along the length thereof, said first and second slots being in alignment with one another;
    a roller mounted for rotation on top of said platform adjacent said bore;
    means for engaging such a cable which extends through said bore with said roller so that for a given length of cable passed through said bore, said roller rotates through a predetermined arc;
    a magnet mounted on said roller adjacent the circumference thereof; and
    means for detecting a magnetic field mounted on said platform adjacent the circumference of said rollers.

7. The apparatus of claim 6 wherein said engaging means includes a second roller mounted for rotation about an axis substantially parallel to said first-mentioned roller on said platform substantially opposite said bore from said first-mentioned roller, said rollers being biased toward one another for receiving such a cable therebetween.

8. The apparatus of claim 6 which further includes a transmitter mounted on said platform and being operatively connected to said detecting means.

9. The apparatus of claim 8 wherein said detecting means includes a magnetically-activated switch which generates a pulse train related to the number of roller rotation and wherein said apparatus further comprises:
    a receiver for receiving a signal transmitted by said transmitter;
    circuitry operatively connected to said receiver for generating a binary count indicative of the number of switch activations; and
    a display operatively connected to said circiutry for generating a visual indication of said binary count.

10. The apparatus of claim 6 wherein said platform includes a first slot extending from one edge thereof to said bore and wherein said tubular base includes a second slot formed axially therein and extending downwardly along one edge thereof from said first slot, said first and second slots being in alignment with one another.

11. The apparatus of claim 2 wherein said biasing means comprises:
    an elongate member extending laterally from said second axle opposite said first roller, the elongate axis of said member being in substantial alignment with the center of each roller; and a spring compressed between the upper side of said frame and the lower side of said elongate member for biasing said second roller toward said first roller.

12. The apparatus of claim 11 which further includes:
a bore through said elongate member; and
a substantially vertical, rigid member extending upwardly from said frame into said elongate member bore, said elongate member being received within said spring.

13. The apparatus of claim 6 wherein the cylindrical tube extending from the top of the well bore is of the type having a gasket therein which is retained by a u-shaped bolt which is received in bores formed through said gasket and through said cylindrical tube, said apparatus further comprising four bores formed in said tubular base, said bores being in alignment with said cylindrical tube bores and said gasket bores when said tubular base is slided onto said cylindrical tube to permit fixing said base on said tube with said u-shaped bolt.

* * * * *